United States Patent Office 3,471,474
Patented Oct. 7, 1969

3,471,474
PENICILLINS AND THEIR PREPARATION
Bertil Åke Ekström and Berndt Olof Harald Sjöberg, Sodertalje, Sweden, assignors to Aktiebolaget Astra, Sodertalje, Sweden, a Swedish company
No Drawing. Filed June 21, 1967, Ser. No. 647,618
Claims priority, application Great Britain, July 15, 1966, 31,932/66
Int. Cl. C07d 99/16
U.S. Cl. 260—239.1
16 Claims

ABSTRACT OF THE DISCLOSURE

Penicillins containing a sulphonylated amino group in the side chain and a process for preparing them, said penicillins having effectiveness as antibacterial agents, nutritional supplements for animals, and for the treatment of diseases caused by micro-organisms.

---

The present invention relates to antimicrobially active compounds and their preparation. In particular it concerns penicillins containing a sulphonylated amino group in the side chain. The compounds prepared according to the present invention are of value as antibacterial agents, as nutritional supplements in animal feeds, as agents for treatment of mastitis in cattle and as therapeutic agents in poultry and animals, including man, in the treatment of infectious diseases caused by micro-organisms.

The compounds of the present invention have the general formula:

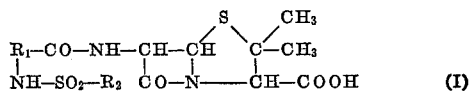

where $R_1$ is an alkylene group of not more than 5 methylene groups, one or more of which may have hydrogen atoms substituted by aliphatic, cycloaliphatic, araliphatic, aromatic or heterocyclic groups, which all can be unsubstituted or substituted by one or more halogen atoms, alkyl-, alkoxy-, aryloxy-, acyloxy-, carbalkoxy-, carboxamido-, alkylmercapto-, nitro-, unsubstituted or substituted amino groups or by alkyl- or aryl-substituted sulphoxy or sulphonyl groups; $R_2$ is an aliphatic-, cycloaliphatic-, araliphatic-, aromatic- or heteroaromatic group, which can all be unsubstituted or substituted by one or more halogen atoms, alkyl-, alkoxy-, aryloxy-, acyloxy-, carbalkoxy-, carboxamido-, alkylmercapto-, nitro-unsubstituted or substituted amino groups or by alkyl- or aryl-substituted sulphoxy or sulphonyl groups.

The invention also comprises non-toxic salts of compounds with the Formula I. The salts include non-toxic metallic salts such as sodium, potassium, calcium and aluminium salts, ammonium salts and substituted ammonium salts, e.g. salts of such non-toxic amines as trialkylamines, including triethylamine, procaine, dibenzylamine, N-benzyl-β-phenethylamine, 1-ephenamine, N,N-dibenzylethylenediamine, dehydroabiethylamine, N,N-bis-dehydroabiethylethylenediamine, and other amines, which have been used to form salts with benzylpenicillin or phenoxymethylpenicillin.

The present invention further provides a process for preparing compounds with the general Formula I which process comprises reacting a compound of the general formula:

or

with a compound of the general formula:

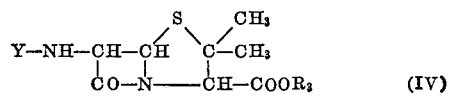

and

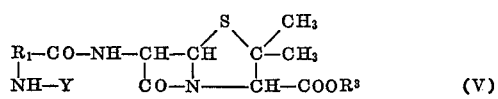

respectively, where $R_1$, $R_2$ have the same meaning as above; $R_3$ is hydrogen, a cation or a di- or trialkylsilyl or a trialkyltin group; CO—X and Y—NH, and respectively $SO_2$—Z and Y—NH, are groups of atoms capable of reacting with each other with formation of a carbon-nitrogen bond and a sulphurnitrogen bond, respectively, so that if necessary or desired after hydrolysis, a

or a —$SO_2$—NH— group is obtained. Particularly Y is hydrogen or at the same time as $R_3$ is a di- or trialkylsilyl group.

The compound of the general Formula II is an acid chloride or its functional equivalent such as an acid bromide, an activated ester, an anhydride, a mixed anhydride, especially one formed with an alkoxy formic acid or a derivative obtained by reaction between a carboxylic acid and a carbodiimide or other compound functioning in the same way, such as N,N'-carbonyldiimidazole or N-ethyl-5-phenylisoxazolium-3'-sulphonate.

The compound of the general Formula III is a reactive sulphonic acid derivative, e.g. a sulphonyl halogenide.

The compounds of the general Formulas IV and V, respectively, may be 6-aminopenicillanic acid and an aminopenicillin or a salt of them with an inorganic base or an organic tertiary base, in which cases the acylation reaction can be performed, if desired or necessary with addition of base, in water or in mixtures of water and organic solvents such as acetone, methyl-isobutylketone, ether, tetrahydrofurane, dimethylformamide, N,N-dimethylacetamide, methylene chloride, chloroform, ethylacetate, butylacetate, benzene or toluene or in dry organic solvents such as chloroform or methylene chloride. Alternatively the compound of the general Formula IV is a N-trialkylsilylaminopenicillanic acid, trialkylsilyl ester or a reaction product obtained by treatment of 6-aminopenicillanic acid with silylating reagents, capable of transferring di- or trialkylsilyl groups to the former, as described in British Patent 959,853 and in Swedish patent application No. 7,167/63. In these cases the acylation reaction is performed, preferably in presence of organic tertiary bases, in dry homogeneous solutions in organic solvents such as ether, tetrahydrofurane, dioxane, dimethylformamide, N,N-dimethylacetamide, methylene chloride, chloroform, carbon tetrachloride, ethylacetate, benzene, or toluene.

In a corresponding way the compound of the general Formula V is a N-trialkylsilylaminopenicillin, trialkylsilylester or a reaction product obtained by treatment of an aminopenicillin with silylating reagents, capable of transferring di- or trialkylsilyl groups to the former and the acylation reaction is carried out under the same conditions as in case of the silyl derivatives of 6-aminopencillanic acid above.

In another alternative way of carrying out the present invention the compounds of the Formulas IV and V are trialkyltin esters or salts thereof, and the reaction is preferably carried out in an organic solvent such as tetrahydrofuran, dimethylformamide, acetonitrile, methylene chloride or mixtures thereof, at room temperature or below, preferably between −5 and +5° C. After purification of the acylation product the ester linkage may readily be cleaved by reaction with nucleophilic agents in non-aqueous solution, e.g. sodium or potassium thiophenoxide in dimethylformamide, or by treatment with an aqueous acid or base under mild conditions.

In cases when a compound of the Formula I, wherein $R_2$ contains an unsubstituted amino group, is to be prepared the corresponding nitro compound is preferably first prepared, which compound is then reduced to the amino compound by known methods.

If the compounds of the general Formula I contain one or more asymmetric centres in the side chains, they may exist in different diastereoisomeric forms, which all are biologically active. It is to be understood that the present invention comprises the diastereoisomers as well as mixtures of them.

The following examples illustrate the invention:

EXAMPLE 1

6-[D-α-(p-chlorobenzenesulphonylamino) phenylacetamido] penicillanic acid

To a stirred and ice-cooled suspension of 6-(D-α-aminophenylacetamido) penicillanic acid (84.8% pure, 8.25 g., 0.02 mole) in a mixture of water (60 ml.) and methylisobutylketone (30 ml.) p-chlorobenzenesulphonylchloride (4.25 g., 0.02 mole) was added. The pH of the reaction mixture was kept at 8.5 by addition of 2 N sodium hydroxide. After 4 h. the mixture was washed with ether, acidified to pH 2.0 and extracted twice with ether. The ether extracts were washed with water and extracted with N potassium bicarbonate solution (21 ml.). Freeze drying of the neutral aqueous extract gave 8.4 g. of the potassium salt of 6-[D-α-(p-chlorobenzenesulphonylamino)-phenylacetamido] penicillanic acid with a purity of 85% (hydroxylamine assay with benzylpenicillin as standard).

The product was found to inhibit the growth of *Staph. aureus*, Oxford at a concentration of 0.06 mcg./ml.

The following penicillins, in the form of their potassium salts, were prepared according to the above procedure. In the list yields and purities (hydroxylamine assay) of the products are given together with their activity against *Staph. aureus*, Oxford, expressed as the minimum inhibitory concentration (MIC):

| Penicillin | Yield (percent) | Purity (percent) | MIC (mcg./ml.) |
|---|---|---|---|
| 6-[D-α-(p-toluenesulphonylamino)-phenylacetamido] penicillanic acid | 76 | 86 | 0.13 |
| 6-[D-α-(p-bromobenzenesulphonylamino)-phenylacetamido] penicillanic acid | 32 | 73 | 0.06 |
| 6-[D-α-(2,5-dichlorobenzenesulphonylamino)-phenylacetamido] penicillanic acid | 10 | 90 | 0.06 |
| 6-(D-α-trichloromethylsulphonylamino-phenylacetamido) penicillanic acid | 5 | 73 | 0.06 |

EXAMPLE 2

6-[D-α-ethoxybenzenesulphonylamino) phenylacetamido] penicillanic acid

To 6-(D-α-amino - phenylacetamido)penicillanic acid (85% pure, 4.1 g., 0.01 mole) in 250 ml. of 60% dioxane p-ethoxybenzenesulphonyl chloride (2.2 g., 0.01 mole), dissolved in 30 ml. of dioxane, was added dropwise during 30 min., while stirring and chilling in an ice-bath. The pH was kept at 8 by addition of a N sodium hydroxide. After stirring for another 60 min. the reaction mixture was washed with ether and the aqueous phase was acidified to pH 1 with dilute hydrochloric acid and extracted with ether three times. The combined ether extracts were washed with water and then extracted with 1 N potassium bicarbonate solution (12 ml.). The aqueous phase obtained was freeze dried to give 3.9 g. (68%) of the potassium salt of 6-[D-α-(p-ethoxybenzenesulphonylamino)phenylcetamido] penicillanic acid with a purity of 94% (hydroxylamine assay with benzylpenicillin as standard).

The product was found to inhibit the growth of *Staph. aureus*, Oxford at a concentration of 0.13 mcg./ml.

In the same manner the folowing penicillins were prepared in the form of their potassium salts.

| Penicillin | Yield (percent) | Purity (percent) | MIC (mcg./ml.) |
|---|---|---|---|
| 6-[D-α-benzenesulphonylamino-phenylacetamido]-penicillanic acid | 97 | 65 | 0.13 |
| 6-[D-α(p-nitrobenzenesulphonylamino)-phenylacetamido] penicillanic acid | 27 | 70 | 0.06 |
| 6-[D-α-(o-methoxybenzenesulphonylamino)-phenylacetamido] penicillanic acid | 64 | 68 | 0.13 |
| 6-[D-α-(p-acetamidobenzenesulphonylamino)-phenylacetamido] penicillanic acid | 52 | 68 | 0.25 |
| 6-(D-α-benzylsulphonylamino-3-thienyl-acetamido) penicillanic acid | 79 | 40 | 0.80 |

EXAMPLE 3

6-(D-α-methylsulphonylamino-phenylacetamido) penicillanic acid

To a stirred and ice-cooled mixture of 6-(D-α-aminoacetamido) penicillanic acid (83.9% pure, 16.5 g., 0.04 mole), water (120 ml.) and methylisobutylketone (60 ml.) methylsulphonyl chloride (4.6 g., 0.04 mole) dissolved in dry ether was added dropwise, while the pH of the mixture was kept at 8.5 by addition of 2 N sodium hydroxide. After the consumption of base had ceased the reaction mixture was washed with ether, acidified to pH 2 and extracted twice with ether. The combined ether extracts were washed with water and extracted with N potassium bicarbonate (20 ml.). The neutral aqueous phase obtained was freeze dried to give 13.2 g. of the potassium salt of 6-(D-α-methylsulphonylamino-phenyl-acetamido) penicillanic acid with a purity of 94% (hydroxylamine assay with benzyl-penicillin as standard).

The product was found to inhibit the growth of *Staph. aureus*, Oxford at a concentration of 0.13 mcg./ml.

EXAMPLE 4

6-(D-α-benzylsulphonylamino-phenylacetamido) penicillanic acid

To a stirred and ice-cooled suspension of 6-(D-α-aminophenylacetamido) penicillanic acid (84.8% pure, 28.8 g., 0.07 mole) in water (200 ml.) and methylisobutylketone (100 ml.) benzylsulphonyl chloride (13.3 g., 0.07 mole) was added, while the pH of the mixture was kept at 8.5. After the consumption of base had ceased the mixture was washed with ether and acidified to pH 2 by addition of hydrochloric acid. A gummy precipitate was removed by filtration and the aqueous phase was extracted three times with ether. The combined ether extracts were washed with water and extracted with 2 N potassium bicarbonate solution (15 ml.). Freeze drying of the obtained neutral aqueous phase gave 10 g. of the potassium salt of 6-(D-α-benzylsulphonylamino-phenylacetamido) penicillanic acid with a purity of 74% (hydroxylamine assay with benzyl-penicillin as standard).

The product was found to inhibit the growth of *Staph. aureus*, Oxford at a concentration of 0.06 mcg./ml.

A part of the product was converted into its isopropylamine salt by treating a solution of the free penicillin in ether with isopropylamine. Recrystallization gave the pure salt (Found: C, 55.29; H, 6.16; N, 9.91; O, 16.86; S, 11.21. Calculated for $C_{23}H_{25}N_3O_6S_2 \cdot C_3H_7NH_2$: C, 55.50; H, 6.09; N, 9.96; O, 17.06; S, 11.40%).

EXAMPLE 5

6-[D-α-(p-nitrobenzylsulphonylamino)-phenylacetamido] penicillanic acid

6 - (D - α - amino-phenylacetamido) penicillanic acid (84.8% pure, 8.25 g., 0.02 mole) was stirred and heated at 80° C. with N-trimethylsilyldiethylamine (24 g., 0.1 mole). A slight vacuum was applied to the system so that the diethylamine formed in the reaction and the excess of the silyl reagent slowly distilled off. Finally the oily residue was evacuated in high vacuum. The glassy residue was dissolved in dry dimethylformamide (60 ml.), containing 2,6-lutidine (2.4 g., 0.022 mole) and cooled in an ice-bath. p-Nitrobenzylsulphonyl chloride (4.7 g., 0.02 mole), dissolved in dry dimethylformamide (20 ml.) was added with stirring. Afterwards the ice-bath was removed and stirring was continued for 3 h. at room temperature. The reaction mixture was poured into water (160 ml.), neutralized by addition of 2 N sodium hydroxide and washed with ether. The aqueous solution was acidified to pH 1 and extracted with ether three times. The combined ether extracts were washed with water and extracted with N potassium bicarbonate (9.5 ml.). The aqueous phase obtained was freeze dried to give 8 g. of the potassium salt of 6-(D-α-p-nitrobenzylsulphonylamino)-phenylacetamido) penicillanic acid with a purity of 31% (hydroxylamine assay with benzylpenicillin as standard). The product was found to inhibit the growth of *Staph. aureus,* Oxford at a concentration of 0.06 mcg./ml.

EXAMPLE 6

α-Benzylsulphonylamino-ethylpenicillin

To N-benzylsulphonyl-alanine (5.0 g., 0.02 mole) and triethylamine (2.0 g., 0.02 mole) in dry dimethylformamide (100 ml.) ethyl chloroformate (2.2 g., 0.02 mole), dissolved in a small volume of ether, was added dropwise with stirring at —10° C. 10 min. after all of the chloroformate had been added an ice-cooled solution of 6-aminopenicillanic acid (6.6 g., 0.03 mole) and triethylamine (3.3 g., 0.033 mole) in water (60 ml.) was rapidly added and stirring was continued for 90 min. without external cooling. The reaction mixture was washed with ether, acidified to pH 1 and extracted three times with ether. The combined ether extracts were washed with water and extracted with N potassium bicarbonate solution (18 ml.). The neutral aqueous solution obtained was freeze-dried to give 4 g. of the potassium salt of α-benzylsulphonylamino-ethylpenicillin with a purity of 40% (hydroxylamine assay with benzylpenicillin as standard).

The product was found to inhibit the growth of *Staph. aureus,* Oxford at a concentration of 2.5 mcg./ml.

N-benzylsulphonyl-alanine was prepared according to H. B. Milne and C.-H. Peng, J. Am. Chem. Soc., 79 (1957), 639.

In the same manner the potassium salt of α-(p-toluenesulphonylamino)-γ-methylthiopropyl-penicillin was prepared from N-p-toluenesulphonyl-methionine (E. W. McChesney and W. K. Swann, Jr., J. Am. Chem. Soc., 59 (1937), 1116). The product was obtained with a purity of 49% (hydroxylamine assay with benzylpenicillin as standard) was found to inhibit the growth of *Staph. aureus,* Oxford at a concentration of 1.25 mcg./ml.

EXAMPLE 7

6-(L-α-benzylsulphonylamino-phenylacetamido) penicillanic acid

To a stirred and ice-cooled suspension of 6-(L-α-aminophenylacetamido)-penicillanic acid (3.5 g., 0.01 mole) in 75% dioxane (50 ml.) benzylsulphonyl chloride (4.6 g., 0.018 mole), dissolved in dry dioxane, was added dropwise, while the pH of the mixture was kept at 8.5 by addition of 2 N sodium hydroxide. The reaction mixture was washed with ether acidfied to pH 1 and extracted with ether three times. The combined ether extracts were washed with water and extracted with N potassium bicarbonate solution until the pH of the aqueous phase reached 6.5. Freeze-drying of the aqueous solution gave the potassium salt of 6-(L-α-benzylsulphonylaminophenylacetamido) penicillanic acid (2.3 g.) with a purity of 64% (hydroxylamine assay with benzylpenicillin as a standard).

The product was found to inhibit the growth of *Staph. aureus,* Oxford at a concentration of 0.63 mcg./ml.

EXAMPLE 8

6-(D-α-2-chlorobenzylsulphonylamino-phenylacetamido)penicillanic acid

6 - (D - α - amino - phenylacetamido)penicillanic acid (85% pure, 7.1 g., 0.017 mole) in 75% dioxane (100 ml.) was treated dropwise at pH 8.5 with a solution of o-chlorobenzylsulphonyl chloride (6.8 g., 0.03 mole) in dioxane, while stirring and cooling in an ice-bath. The pH of the mixture was kept constant by gradual addition of 2 N sodium hydroxide. The reaction mixture was washed with ether, acidified to pH 1 and extracted three times with ether. The combined ether extracts were washed with water and extracted with a N potassium bicarbonate solution until the aqueous phase was neutral. Freeze-drying of the latter gave the potassium salt of 6- (D - α - 2 - chlorobenzylsulphonylamino - phenylacetamido)penicillanic acid (4.0 g.) with a purity of 71% (hydroxylamine assay).

The product was found to inhibit the growth of *Staph. aureus,* Oxford at a concentration of 0.13 mcg./ml.

In the manner described in Example 8 the following penicillins were prepared by reacting the appropriate sulfonyl chloride with 6 - (D - α - aminophenylacetamido)penicillanic acid. In the table yields and purities (hydroxylamine assay with benzylpenicillin as standard) of the products are given together with their minimum inhibitory concentration (MIC) against *Staph. aureus,* Oxford.

| Penicillin | Yield (percent) | Purity (percent) | MIC (mcg./ml.) |
|---|---|---|---|
| 6-(D-α-2-fluorobenzylsulphonyl aminophenylacetamido)penicillanic acid | 42 | 72 | 0.06 |
| 6-(D-α-3-fluorobenzylsulphonyl-aminophenylacetamido)penicillanic acid | 57 | 68 | 0.13 |
| 6-(D-α-3-chlorobenzylsulphonyl-aminophenylacetamido)penicillanic acid | 63 | 71 | 0.06 |
| 6-(D-α-4-chlorobenzylsulphonyl-aminophenylacetamido)penicillanic acid | 53 | 68 | 0.06 |
| 6-(D-α-2-bromobenzylsulphonyl-aminophenylacetamido)penicillanic acid | 20 | 69 | 0.06 |
| 6-(D-α-2-iodobenzylsulphonylami-nophenylacetamido)penicillanic acid | 50 | 72 | 0.13 |
| 6-(D-α-2,4-dichlorobenzylsulphonyl-aminophenylacetamido)penicillanic acid | 25 | 63 | 0.13 |
| 6-(D-α-3,4-dichlrobenzylsulpho-nylamino-phenylacetamido)penicillanic acid | 34 | 98 | 0.03 |
| 6-(D-α-2-nitrobenzylsulphonylami-no-phenylacetamido)penicillanic acid | 13 | 54 | 0.13 |
| 6-(D-α-3-nitrobenzylsulphonylami-no-phenylacetamido)penicillanic acid | 22 | 83 | 0.13 |
| 6-[D-α-2-phenacyloxycarbonyl-)benzylsulphonylamino-phenylacetamido] penicillanic acid | 10 | 82 | 6.25 |

The sulphonyl chlorides were obtained by standard procedures, involving treatment of the appropriately substituted benzyl halogenides with sodium sulphite to give the corresponding sodium benzylsulphonates, which then were treated with phosphorus pentachloride.

The following sulphonyl chlorides were not found in the literature:

2 - fluorobenzylsulphonyl chloride, M.P. 52–53.5° C. (Found: C, 39.87; H, 3.05; Cl, 17.03; S, 15.16. Calc. for $C_7H_6ClFO_2S$: C, 40.30; H, 2.90; Cl, 16.99; S, 15.37%);

3 - fluorobenzylsulphonyl chloride, M.P. 36–38° C. (Found: Cl, 17.1; S, 15.23. Calc. for $C_7H_6ClFO_2S$: Cl, 16.99; S, 15.37%);

3 - chlorobenzylsulphonyl chloride, M.P. 72–73° C. (Found: Cl, 31.09; S, 14.60. Calc. for $C_7H_6Cl_2O_2S$: Cl, 31.50; S, 14.25);

2 - bromobenzylsulphonyl chloride, M.P. 78–79° C.

(Found: C, 31.18; H, 2.24; Br, 29.52; Cl, 13.08; O, 11.98; S, 11.92. Calc. for $C_7H_6BrClO_2S$: C, 31.19; H, 2.24; Br, 29.65; Cl, 13.15; O, 11.87; S, 11.90%);

2 - iodobenzylsulphonyl chloride, M.P. 102° C. (Found: Cl, 11.01; J, 40.61. Calc. for $C_7H_6ClJO_2S$: Cl, 10.92; J, 40.22%);

2 - nitrobenzylsulphonyl chloride, M.P. 63–64° C. (Found: Cl, 15.01; S, 13.17. Calc. for $C_7H_6ClNO_4S$: Cl, 15.05; S, 13.61%);

2 - phenacyloxycarbonyl - benzylsulphonyl chloride, oil (used directly).

EXAMPLE 9

6-(D-α-3-aminobenzylsulphonylamino-phenylacetamido) penicillanic acid

Palladium on carbon-catalyst (10%, 1 g.) in 90% isopropanol (50 ml.) was hydrogenated for 30 min. at room temperature and pressure. The potassium salt of 6-(D - α - 3 - nitrobenzylsulphonylamino - phenylacetamido)penicillanic acid (83% pure, 1.2 g.) dissolved in water (10 ml.) and isopropanol (40 ml.) was added and the hydrogenation was continued for 90 min., after which time no more hydrogen was absorbed. The catalyst was removed by filtration and the reddish solution was diluted with isopropanol and concentrated in vacuo at 30° C. to give the potassium salt of 6 - (D - α - 3 - aminobenzylsulphonylamino - phenylacetamido)penicillanic acid (1.1 g., 79%) with a purity of 47% (hydroxylamine assay).

The product was found to inhibit the growth of *Staph. aureus*, Oxford at a concentration of 1.25 mcg./ml.

EXAMPLE 10

α-Benzylsulphonylamino-β-indolyl(-3) ethylpenicillin

N - benzylsulphonyltryptophan (3.6 g., 0.01 mole) and triethylamine (1 g., 0.01 mole) were dissolved in dry dimethylformamide (50 ml.) and treated dropwise at −10° to −15° C. with ethyl chloroformate (1.1 g., 0.01 mole), while stirring. After 10 min. a solution of 6-aminopenicillanic acid (3.2 g., 0.015 mole) and triethylamine (1.6 g., 0.016 mole) in water (25 ml.) was added all at once and stirring was continued for 90 min. without cooling. The reaction mixture was washed twice with ether, acidified to pH 2 and extracted with ether three times. The combined ether extracts were washed with water and extracted with N potassium bicarbonate solution until the aqueous phase was neutral. Freeze-drying of the latter gave the potassium salt of α - benzylsulphonylamino - β - indolyl(-3) - ethylpenicillin (2.5 g.) with a purity of 50% (hydroxylamine assay).

The product was found to inhibit the growth of *Staph. aureus*, Oxford at a concentration of 2.5 mcg./ml.

EXAMPLE 11

α-Benzylsuphonylamino-heptylpenicillin

In the manner described in Example 10 the potassium salt of α-benzylsulphonylamino-heptylpenicillin was prepared from α-benzylsulphonylaminoheptanoic acid and 6-aminopenicillanic acid.

The product was found to inhibit the growth of *Staph. aureus*, Oxford at a concentration of 1.25 mcg./ml.

EXAMPLE 12

α-Benzylsuphonylamino-γmethylbutylpenicillin 6-aminopenicillanic acid (1.6 g., 0.0076 mole) and N-trimethyl-silyl-diethylamine were heated together at 80° C. for 30 min., the formed diethylamine being distilled off continuously. The obtained solution was concentrated to a thick oil in vacuo. N-benzylsulphonyl-leucine (2.1 g., 0.0076 mole), dissolved in dry tetrahydrofurane (50 ml.) was treated dropwise with phosphorus oxychloride (1.2 g., 0.0076 mole), followed by triethylamine (0.77 g., 0.0076 mole), while stirring at −20° to −30° C. The trimethylsilyl derivative of 6-aminopenicillanic acid, dissolved dry ethylacetate (50 ml.) was added and stirring was continued for 2 hrs. at −10° to −20° C. The temperature was allowed to rise to 0° and the reaction mixture was poured into its own volume of water, which was kept neutral by addition of 2 N sodium hydroxide. After washing with ether the mixture was acidified to pH 2 and extracted three times with ether. The combined ether extracts were washed with water and extracted with N potassium bicarbonate until the aqueous phase was neutral. Freeze-drying of the latter gave the potassium salt of α-benzylsulphonylamino-γ-methylbutylpenicillin (0.9 g.) with a purity of 57% (hydroxylamine assay).

The product was found to inhibit the growth of *Staph. aureus*, Oxford at a concentration of 0.31 mcg./ml.

EXAMPLE 13 p-Toluenesulphonylamino-methylpenicillin p-Toluenesulphonylaminoacetyl chloride (2.9 g., 0.012 mole), dissolved in dry ether, was added to a stirred and ice-cooled suspension of 6-aminopenicillanic acid in 30 ml. of water and 15 ml. of methylisobutyl ketone, held at pH 7 by gradual addition of 2 N sodium hydroxide. After the consumption of base had ceased the reaction mixture was washed with ether, acidified to ph 2 and extracted with ether three times. The combined ether extracts were washed with water and extracted with N potassium bicarbonate until the aqueous phase was neutral. Freeze-drying of the aqueous phase gave the potassium salt of p-toluenesulphonylamino-methylpenicillin (3.1 g.) with a purity of 77% (hydroxylamine assay).

The product was found to inhibit the growth of *Staph. aureus*, Oxford at a concentration of 0.08 mcg./ml.

EXAMPLE 14

ε-p-Toluenesulphonylaminopentylpenicillin

ε-p-Toluenesulphonylamino-carbroic acid (2.9 g., 0.01 mole) and triethylamine (1 g., 0.01 mole) in dimethylformamide (50 ml.) were treated dropwise with ethylchloroformate (1.1 g., 0.01 mole), dissolved in dry ether, while stirring at −10° C. After 15 min. a solution of 6-aminopenicillanic acid (3.2 g., 0.015 mole) and triethylamine (1.6 g., 0.016 mole) in water (25 ml.) was added all at once and stirring was continued for 90 min. without cooling. The reaction mixture was neutralized and washed with ether, acidified to pH 2 and extracted three times with ether. The combined ether extracts were washed with water and extracted with N potassium bicarbonate until the aqueous phase was neutral. Freeze-drying of the latter gave the potassium salt of ε-p-toluenesulphonylaminopentylpenicillin with a purity of 22% (hydroxylamine assay).

The product was found to inhibit the growth of *Staph. aureus*, Oxford at a concentration of 0.16 mcg./ml.

EXAMPLE 15

β-p-Toluenesulphonylaminoethylpenicillin

Starting from N-p-toluenesulphonyl-β-alanine (2.4 g., 0.01 mole) the potassium salt of β-p-toluenesulphonylamino-ethylpenicillin (1.0 g.) with a purity of 83% (hydroxylamine assay) was prepared in the manner, described in Example 15.

The product was found to inhibit the growth of *Staph. aureus*, Oxford at a concentration of 0.16 mcg./ml.

What is claimed is:
1. Compounds represented by the formula:

$$\begin{array}{c} \phantom{R_1-CO-NH-CH-CH}\diagup S \diagdown \phantom{x}\diagup CH_3 \\ R_1-CO-NH-CH-CH \phantom{xx} C-CH_3 \\ \phantom{R_1-CO-NH-}|\phantom{xxxxxxxx}| \\ NH-SO_2-R_2 \phantom{x} CO-N\!\!-\!\!-\!\!-\!\!CH-COOH \end{array} \quad (I)$$

where $R_1$ is an unsubstituted or substituted alkylene group of not more than 5 methylene groups, said substituted alkylene containing substituents selected from the group consisting of lower alkyl, phenyl, thienyl and indolylmethyl, which substituents all can be unsubstituted or substituted by one or more halide, lower alkyl, lower alkoxy, lower alkanoyloxy, phenacyloxycarbonyl, carboxamido, amino, sulphoxy, sulphonyl, or lower alkylmercapto radicals; $R_2$ is lower alkyl, phenyl or benzyl, which can all be unsubstituted or substituted by one or more halide, lower alkyl, lower alkoxy, phenacyloxycarbonyl, nitro, lower alkanoyloxy, carboxamido, alkylmercapto, sulphoxy, sulphonyl, amino or (lower alkanoyl)-substituted amino radicals, and non-toxic salts thereof.

2. Compounds according to claim 1, wherein $R_1$ is benzylidene.

3. Compounds according to claim 2 wherein the moiety

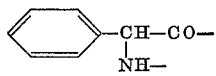

has D-configuration.

4. Compounds according to claim 1, wherein $R_1$ is unsubstituted 3-thienylidene.

5. Compounds according to claim 1, wherein $R_1$ is lower alkyl.

6. Compounds according to claim 1, wherein $R_2$ is benzyl, which may be unsubstituted or substituted by a nitro radical or by one or two halide radicals.

7. Compounds represented by the formula:

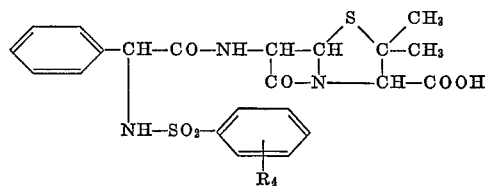

wherein $R_4$ is a hydrogen or halogen atom or a nitro or an alkyl group of at most 5 carbon atoms, and non-toxic salts thereof.

8. 6 - (D - a-benzylsulphonylamino-phenylacetamido) penicillanic acids represented by the formula:

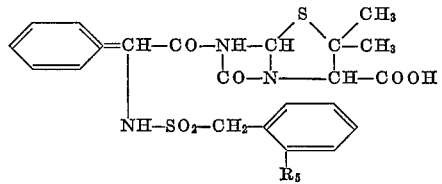

wherein $R_5$ is a hydrogen or halogen atom, and non-toxic salts thereof.

9. 6 - (D - a-benzylsulphonylaminophenylacetamido)-penicillanic acids represented by the formula:

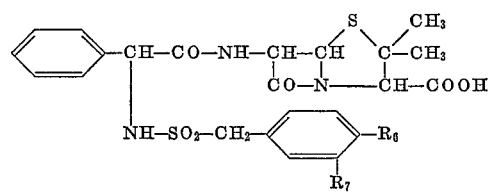

wherein $R_6$ represents hydrogen, halide, or nitro radical; and $R_7$ is hydrogen and, when $R_6$ is hydrogen, also halide, or nitro radical, and when $R_6$ is halide, $R_7$ also may be equal to $R_6$, and non-toxic salts thereof.

10. 6 - (a-benzylsulphonylamino-3 - thienylacetamido) penicillanic acid and its non-toxic salts.

11. Process for the preparation of compounds of the formula:

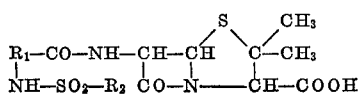

in which process a compound of the formula

(II)

or

(III)

is reacted with a compound of the formula:

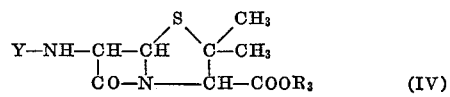

(IV)

and

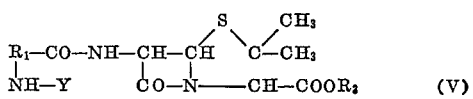

(V)

respectively, wherein $R_1$ is an unsubstituted or substituted alkylene group of not more than 5 methylene groups, said substituted alkylene containing substituents selected from the group consisting of lower alkyl, phenyl, thienyl and indolylmethyl, which substituents all can be unsubstituted or substituted by one or more halide, lower alkyl, lower alkoxy, lower alkanoyloxy, phenacyloxycarbonyl, carboxamido, amino, sulphoxy, sulphonyl or lower alkylmercapto radicals; $R_2$ is lower alkyl, benzyl, or phenyl, which can all be unsubstituted or substituted by one or more halide, lower alkyl, lower alkoxy, phenacyloxycarbonyl, nitro, lower alkanoyloxy, carboxamido, alkylmercapto, sulphoxy, sulphonyl, amino, or (lower alkanoyl)-substituted amino radicals; $R_3$ is hydrogen, a cation or a di- or trialkylsilyl or a trialkyltin group; CO—X and Y—NH, and respectively $SO_2$—Z and Y—NH, are groups of atoms capable of reacting with each other with formation of a carbon-nitrogen bond and a sulphur-nitrogen bond, respectively, so that, if necessary or desired after hydrolysis, a —CO—NH— or —$SO_2$—NH— group is obtained.

12. Process according to claim 11, wherein a compound of Formula II is reacted with a compound of Formula IV, the compound of the Formula II is (1) the acid chloride, acid bromide or anhydride of the carboxylic acid of Formula II, wherein X is OH, or (2) the mixed anhydride of said carboxylic acid with an alkoxy formic acid or dichlorophosphoric acid, or (3) the derivative obtained by reaction between said carboxylic acid and N,N'-dicyclohexylcarbodiimide or other compound functioning in the same way, and the compound of the Formula IV is 6-aminopenicillanic acid.

13. Process according to claim 12, wherein a compound of Formula III is reacted with a compound of Formula V, and the compound of the Formula III is a sulphonyl chloride and the compound of the Formula V is an aminopenicillin.

14. Process according to claim 12, wherein a compound of Formula II is reacted with a compound of Formula IV and the compound of the Formula IV is a N-tri(lower alkyl)-silylaminopenicillanic acid tri-(lower alkyl)-silylester or the reaction product obtained by treatment of 6-aminopenicillanic acid with a di- or tri-(lower alkylsilyl)-containing compound capable of transferring di- or tri-(lower alkyl)-silyl groups to the 6-aminopenicillanic acid; and the compound of the Formula II is (1) the acid chloride, acid bromide or anhydride of the carboxylic acid of Formula II, wherein X is OH, or (2) the mixed anhydride of said carboxylic acid with an alkoxy formic acid or dichlorophosphoric, or (3) the derivative obtained by reaction between said carboxylic acid and N,N'-dicyclohexylcarbodiimide or other compound functioning in the same way.

15. Process according to claim 12, wherein a compound of Formula III is reacted with a compound of Formula V, and the compound of the Formula III is a sulphonyl chloride; and the compound of the Formula V is a N-tri-(lower alkyl) silylaminopenicillin tri-(lower alkyl)-silylester or the reaction product obtained by treatment of an aminopenicillin with a di- or tri-(lower alkyl)-silyl-containing compound capable of transferring di- or tri-(lower alkyl)-silyl groups to the aminopenicillin.

16. Process according to claim 12, wherein the compounds of the Formulas IV and V are the esters of the compounds of Formulas IV and V with trialkyltin and after the acylation the cleavage of the ester linkage is brought about by reaction with a thiophenolate in non-aqueous solution or by treatment with an aqueous acid or base under mild conditions.

No references cited.

NICHOLAS S. RIZZO, Primary Examiner

U.S. Cl. X.R.

260—999

PO-1050
(5/69)

UNITED STATES PATENT OFFICE
CERTIFICATE OF CORRECTION

Patent No. 3,471,474          Dated October 7, 1969

Inventor(s) Bertil Ake Ekstrom and Berndt Olof Harald Sjoberg

It is certified that error appears in the above-identified patent and that said Letters Patent are hereby corrected as shown below:

Col. 3, line 56, "6-[D-α-ethoxybenzenesulphonylamino)" should be
-- 6-[D-α-(p-ethoxybenzenesulphonylamino) --;
Col. 3, line 73, "phenylcetamido" should be -- phenylacetamido --;
Col. 4, line 3, "folowing" should be -- following --;
Col. 4, line 18, "0.80" should be -- 0.08 --;
Col. 4, line 23, after "(D-α-amino-" insert -- phenyl --;
Col. 5, line 67, "acidfied" should be -- acidified --;
Col. 6, line 49, "dichlroobenzylsulpho-" should be
-- dichlorobenzylsulpho- --;
Col. 6, line 56, "6-[D-α-2-phenacyloxycarbonyl-)" should be
-- 6-[D-α-(2-phenacyloxycarbonyl-) --;
Col. 8, line 26, "ph" should be -- pH --.

SIGNED AND
SEALED
MAY 26 1970

(SEAL)
Attest:

Edward M. Fletcher, Jr.
Attesting Officer

WILLIAM E. SCHUYLER, JR.
Commissioner of Patents